H. C. LONGENECKER & J. C. PROTZMAN.
PUMP OPERATING MECHANISM.
APPLICATION FILED MAY 22, 1907.

927,365.

Patented July 6, 1909.
2 SHEETS—SHEET 1.

WITNESSES:
Thos. W. Perry
E. H. Head.

INVENTORS
H. C. Longenecker
J. C. Protzman
BY
W. J. Fitzgerald & Co.
Attorneys

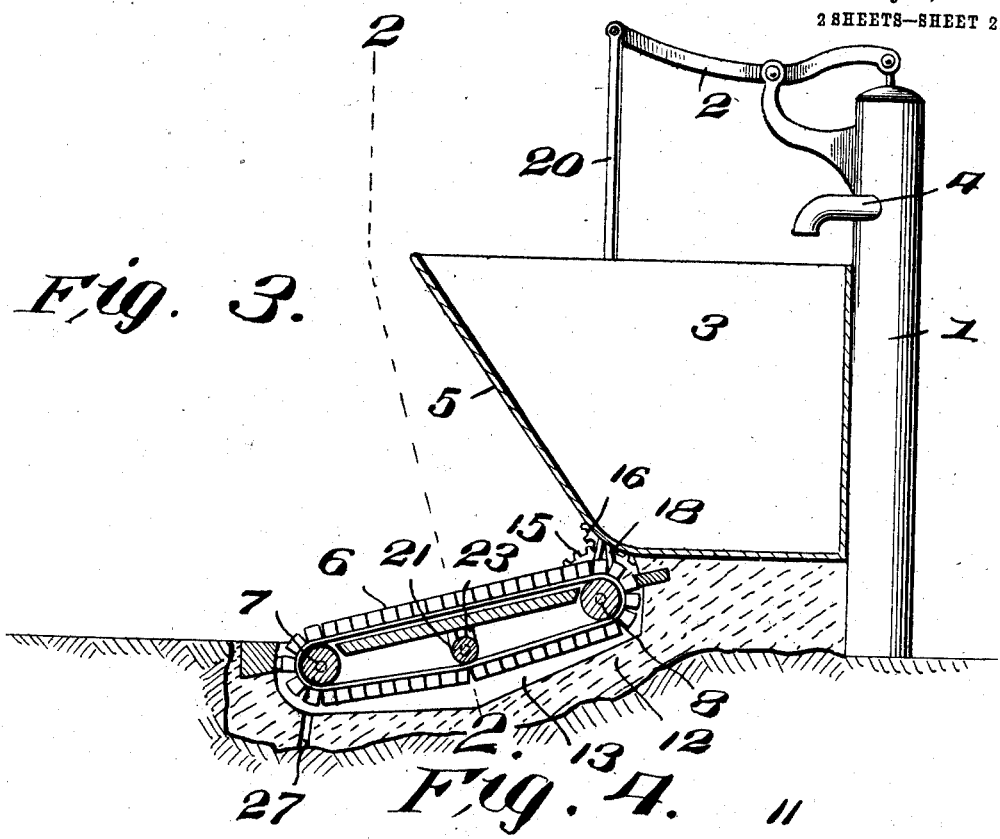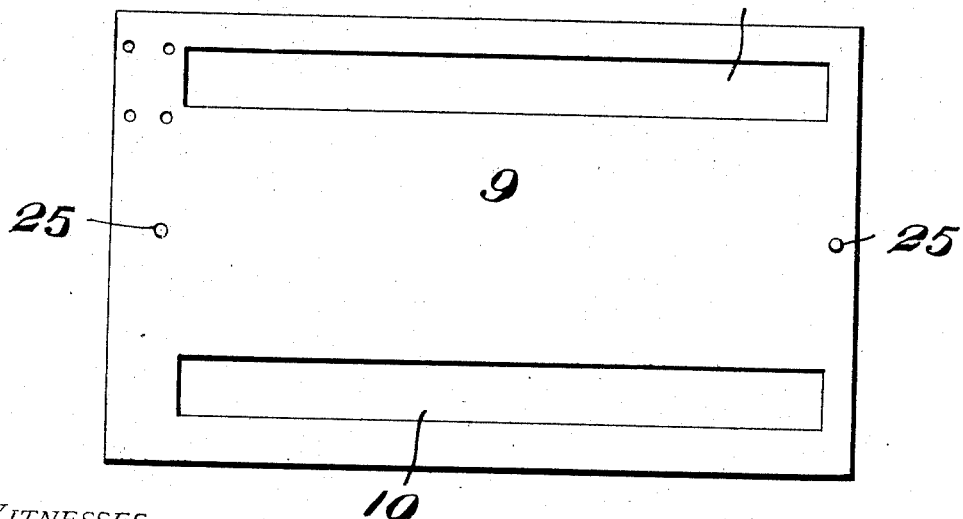

UNITED STATES PATENT OFFICE.

HAROLD C. LONGENECKER AND JOHN C. PROTZMAN, OF VERONA, OHIO.

PUMP-OPERATING MECHANISM.

No. 927,365.      Specification of Letters Patent.      Patented July 6, 1909.

Application filed May 22, 1907. Serial No. 375,151.

*To all whom it may concern:*

Be it known that we, HAROLD C. LONGENECKER and JOHN C. PROTZMAN, citizens of the United States, residing at Verona, in the county of Preble and State of Ohio, have invented certain new and useful Improvemeants in Pump-Operating Mechanism; and we do hereby declare the following to be a full, clear, and exact description of the invention, such as will enable others skilled in the art to which it appertains to make and use the same.

This invention relates to new and useful improvements in motors, and it is an object of the invention to provide a novel device of this character including a treadway.

It is also an object of the invention to provide a novel device of this character which will be simple of construction, efficient and advantageous in practice, and comparatively inexpensive to manufacture.

Figure 1:
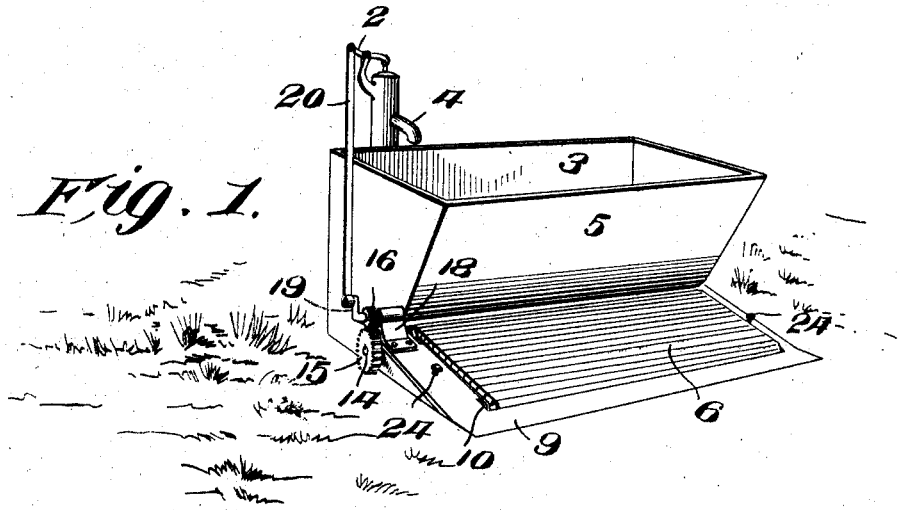
Figure 2:
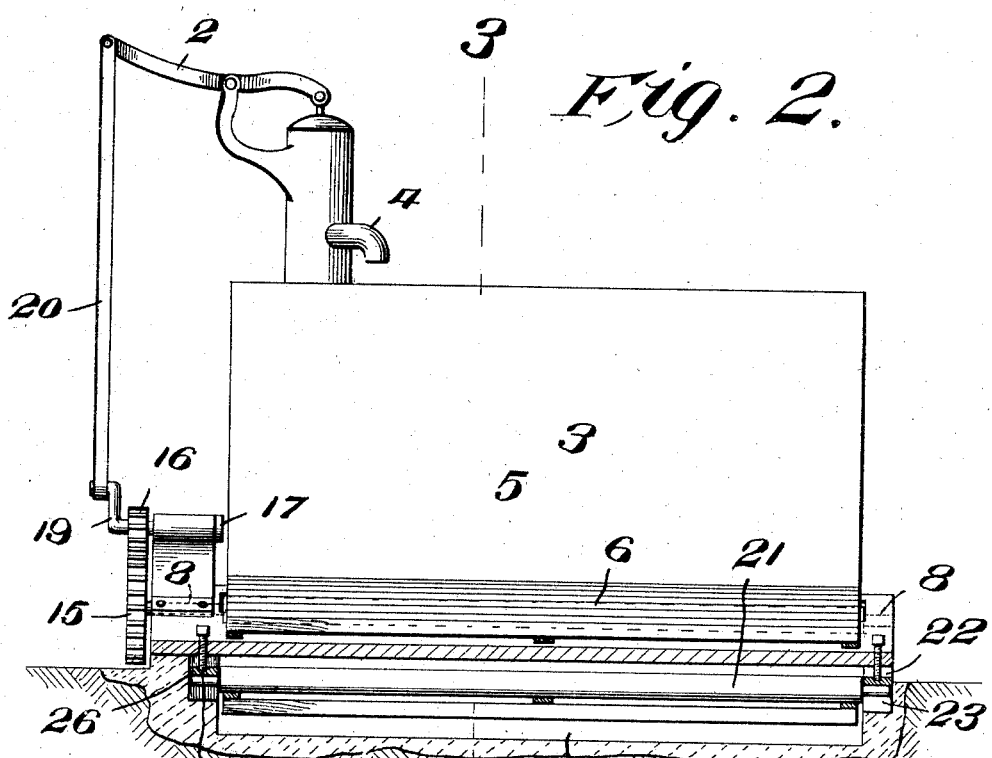

In describing the invention in detail, reference will be had to the accompanying drawings forming part of this specification wherein like characters of reference denote corresponding parts in the several views, and in which, Figure 1 is a perspective view of our improved pump operating mechanism in its operative position. Fig. 2 is a sectional view thereof as seen on line 2—2 Fig. 3. Fig. 3 is a sectional view as seen on line 3—3 Fig. 2, and, Fig. 4 is a detail plan view of the platform employed in connection with the treadway.

Referring to the drawings in which similar reference numerals designate corresponding parts throughout the several views, 1 indicates a pump which may be of the usual or any preferred form which is provided with an operating handle 2, and 3 indicates a drinking trough which is disposed in position to receive the water.

A treadway 6 in the form of an endless belt is directed around rollers 7 and 8, which are in turn rotatably mounted on a platform 9, said platform being so arranged that the upper surface thereof will be substantially in line with the upper edges of the rollers 7 and 8, said platform being provided with slots 10 and 11 through which the upper portion of the rollers 7 and 8, respectively extend, the slots providing a passage for the treadway around the rollers, the portion of the platform intermediate the slots 10 and 11 being positioned between the sections of the treadway 6 and in close proximity to the upper section thereof. The platform 9 is seated upon a foundation 12 which is preferably formed of cement or like material and is so arranged as to dispose the platform and treadway at an angle to the surrounding surface, the highest end of the treadway being adjacent the drinking trough 3, the foundation 12 being so constructed as to support the drinking trough and in order to compensate for the treadway and the supporting rollers therefor, a pit 13 is formed in the surface of the foundation and the treadway seated therein.

The supporting shaft 14 of the roller 8 is extended beyond one end of the foundation 12 and has secured thereto a driving gear 15 with which meshes a pinion 16, said pinion being carried by a stub-shaft 17 which is in turn mounted in a bearing 18 extending upwardly from the platform 9. The outer end of the stub shaft 17 is provided with a crank 19 to which is secured one end of a pitman 20, the opposite end thereof in the present instance being secured to the free end of the handle 2 and by this construction it will be seen that when the treadway is moved around the rollers 7 and 8 that the handle 2 will be operated to pump water through the medium of the gears 15 and 16 and pitman 20.

In order to hold the treadway sufficiently taut around the rollers 7 and 8 as to cause the roller 8 to positively rotate we provide a tension roller 21 which is placed below the central portion of the platform 9 and adapted to rest on the inner face of the treadway, the ends of the tension roller entering channels 22 in brackets 23, the brackets being secured in any preferred manner to the lower face of the platform and in order to direct tension upon the treadway to draw the same in firmer contact with the rollers 7 and 8, we direct tension screws 24 through threaded bores 25 in the platform, the inner ends of said screws engaging bearing blocks 26 which in turn rest upon the ends of the tension roller 21 inserted in the channels and it will be seen that when the screws 24 are turned so as to lower the same, the tension roller 21 will be likewise lowered and tension exerted upon the treadway.

While the motor has been described as being employed in conjunction with a pump it is to be stated that such a combination forms no part of the present invention as the power derived from the motor may be employed for any purpose.

What we claim is:

The herein described power mechanism comprising an inclined endless treadway, a platform having openings therein through which the treadway passes, the portion of the platform intermediate the openings therein being positioned between sections of said treadway and in close proximity to the upper section, means to support said platform, a roller at each end of said treadway and rotatably mounted on said platform, means secured to one of the rollers to deliver power when the treadway is moved, a tension roller below said platform acting in conjunction with the lower section of the treadway, brackets having channels therein to receive the ends of said tension roller, bearing blocks in said channels and tension screws directed through said platform engaging with said bearing blocks whereby the tension roller may be moved as desired.

In testimony whereof we have signed our names to this specification in the presence of two subscribing witnesses.

HAROLD C. LONGENECKER.
JOHN C. PROTZMAN.

Witnesses:
FLOYD O. PANSING,
SIDNEY VAUGHAN.